United States Patent [19]

March

[11] Patent Number: 4,786,221
[45] Date of Patent: Nov. 22, 1988

[54] QUICK RELEASE CHUCK MECHANISM AND METHOD FOR ACHIEVING INTERCHANGE ABILITY OF TOOL INSERTS THEREIN

[75] Inventor: Kenneth L. March, York, Pa.

[73] Assignee: Ettco Tool & Machine Co., Inc., York, Pa.

[21] Appl. No.: 899,884

[22] Filed: Aug. 25, 1986

[51] Int. Cl.⁴ .................... B23C 5/26; B23B 31/04
[52] U.S. Cl. ...................... 409/218; 279/1 B; 279/1 S; 279/74; 408/239 R
[58] Field of Search .......... 279/1 B, 1 ME, 1 S, 279/76, 82, 86, 75, 1 TS, 1 A, 74, 83; 409/230, 231, 232, 233, 234, 218; 408/239 R, 239 A, 240

[56] References Cited

U.S. PATENT DOCUMENTS

| | | | |
|---|---|---|---|
| 922,936 | 5/1909 | Miller | 279/82 |
| 2,488,822 | 11/1949 | McDonald | 279/1 S X |
| 2,680,636 | 6/1954 | Griftin | 279/82 |
| 2,709,600 | 5/1955 | Lehde | 408/239 R |
| 2,857,166 | 10/1958 | Conn et al. | 279/83 |
| 2,860,883 | 11/1958 | Better et al. | 279/83 |
| 3,136,563 | 6/1964 | Swanson | 279/1 S X |
| 3,618,962 | 11/1971 | Cox et al. | 279/82 |
| 3,664,677 | 5/1972 | Sunderman et al. | 279/1 A X |
| 3,851,890 | 12/1974 | Smith | 279/75 |
| 4,197,044 | 4/1980 | Cummings | 279/82 X |
| 4,204,304 | 5/1980 | Eidam | 279/82 |
| 4,437,801 | 3/1984 | Lewis | 409/234 |

FOREIGN PATENT DOCUMENTS

| | | | |
|---|---|---|---|
| 014189 | 1/1963 | Fed. Rep. of Germany | 279/82 |
| 733896 | 5/1980 | U.S.S.R. | 279/1 S |
| 1191297 | 5/1970 | United Kingdom | 279/1 TS |

*Primary Examiner*—Z. R. Bilinsky
*Attorney, Agent, or Firm*—Cumpston & Shaw

[57] ABSTRACT

An improved quick release chuck mechanism is disclosed mountable on a spindle for releasably holding a tool or the like. The chuck mechanism comprises a body member having an end surface. A tool insert having a shoulder is supported by the body member. The end surface is provided with an adjustment for varying the position of the end surface for achieving a predetermined end surface position while mounted on the spindle. The tool insert is releasably held in the body member by an improved locking mechanism that positively forces the shoulder into engagement with the end surface. The improved chuck mechanisms, when mounted on multiple head spindles, provide a method for compensating for tolerance differences that exist between the spindles to achieve identical predetermined end surface positions for the spindles. Consequently, a preset sharpened tool insert of a finite length can be interchanged for a dulled tool insert without requiring any adjustment to maintain the tip of the sharpened tool in a reference plane that is a fixed distance from the predetermined end surface position.

13 Claims, 3 Drawing Sheets

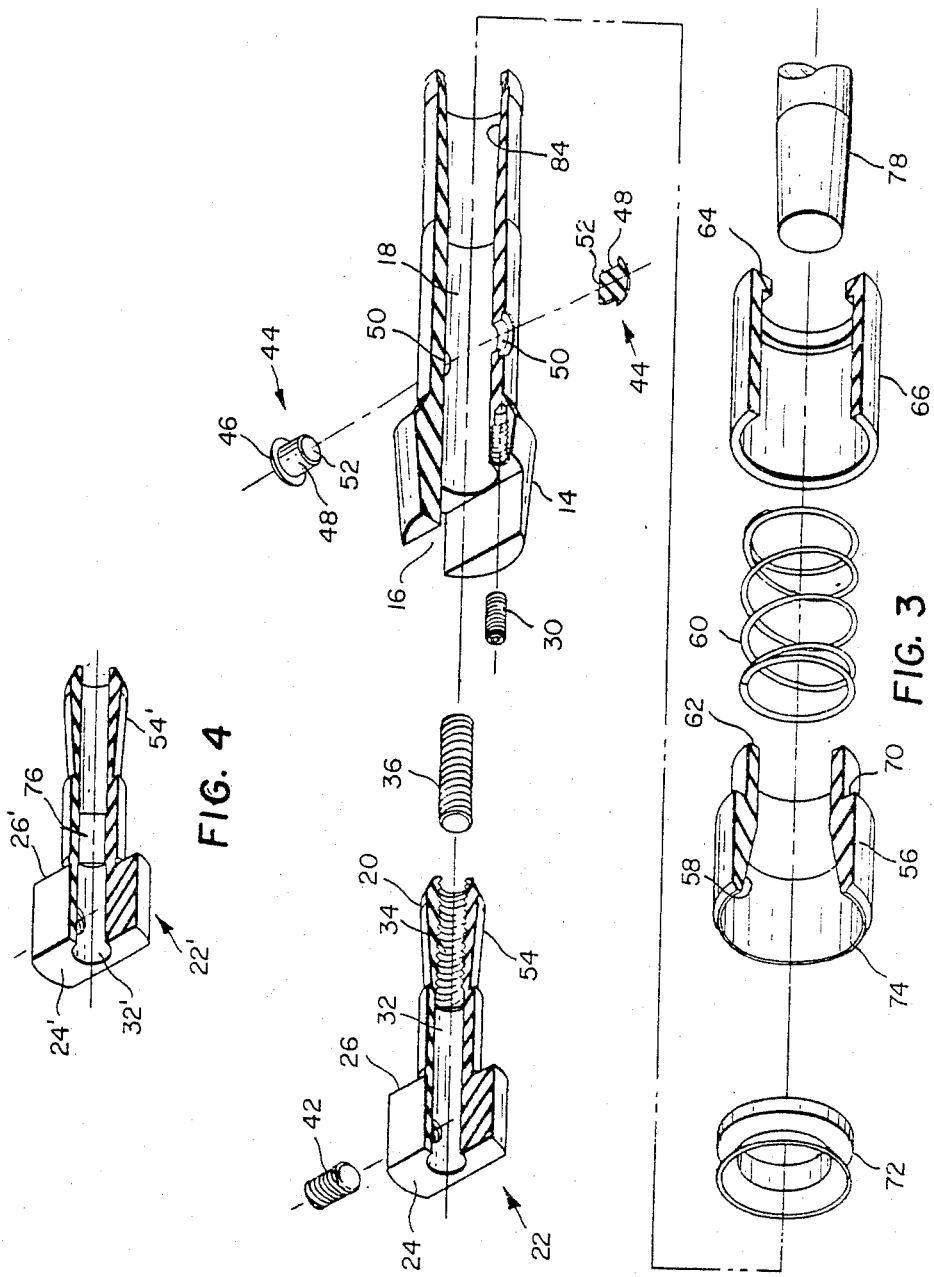

QUICK RELEASE CHUCK MECHANISM AND METHOD FOR ACHIEVING INTERCHANGE ABILITY OF TOOL INSERTS THEREIN

BACKGROUND OF THE INVENTION

1. Field of the Invention

The present invention relates generally to chuck mechanisms, and more specifically to an improved quick release quick mechanism mountable on a spindle for releasably holding a tool or the like. The improved chuck mechanism further provides a method for quickly interchanging a sharpened tool insert for a dulled tool insert on a multiple spindle head without requiring any further adjustment to align the tip of the sharpened tool in the same plane as the tips of the remaining tools in the head.

2. Description of the Prior Art

U.S. Pat. No. 2,338,626, which issued on Jan. 4, 1944 to Emrick, discloses a tool chuck comprising a body member mountable on a spindle, and a tool insert supported by the body member. The tool insert has an axially extending adjusting screw for varying the axial position of the insert relative to the body member, an adjusting screw on the insert for axially varying the position of a tool inserted therein, and radially extending set screws in the insert for securing the tool to the insert.

In U.S. Pat. Nos. 961,777 and 2,338,095, which issued to Imboden and Campbell respectively, on June 21, 1910 and Jan. 4, 1944 respectively, chuck mechanisms are disclosed, each comprising a body member for receiving an insert mounted within an axial bore in the chuck mechanism. In Imboden, the insert supports a drill and the insert and drill are both secured to the chuck mechanism by a set screw. In Campbell, the insert is secured to the chuck member by a set screw. The insert further has an axial screw for adjusting the position of the tool supported thereby. The screw and tool are both secured to the insert by set screws.

U.S. Pat. Nos. 1,091,886; 3,586,344; 3,788,658; 4,202,557; and 4,491,443 all relate to quick release chuck mechanisms for releasably holding a tool or the like. In U.S. Pat. No. 1,091,886, which issued to Koontz on Mar. 31, 1914, the means for releasably holding a tool insert to the spindle comprises a flat substantially semicircular lock member on the spindle nestable in a complementary slot in the tool insert. U.S. Pat. No. 3,586,344, which issued to Nixon on June 22, 1971, discloses a quick change tool assembly in which a tool insert is releasably held to a spindle driver by an inclined threaded pin thereon engageable with a semi-circular notch on the tool insert. U.S. Pat. No. 3,788,658, which issued to Benjamin et al. on Jan. 29, 1974, discloses an instant change tool holder wherein a rotatable sleeve on the housing is axially movable between a locking position for holding steel balls in a peripheral groove on the tool insert, and an unlocking position for releasing the steel balls to allow detachment of the tool insert. In U.S. Pat. No. 4,202,557, which issued to Haussmann et al. on May 13, 1980, a drilling device is disclosed in which a radially extending lock pin on the drive member engages a slot in the tool insert. An axially movable sleeve on the drive member is movable between a locking position in which the lock pin is held in the slot, and a retracted position in which the lock pin is released from the slot to allow detachment of the tool insert from the drive member. U.S. Pat. No. 4,491,443, which issued to DeCaro on Jan. 1, 1985, is directed to an adapter for a torquing tool, including an elongated body member having a bore at one end to accommodate a working member, and a coupling means for detachably attaching the body to the tool. The improvement therein comprises quick release means internal of the body member and external of the tool to detachably retain the working member within the bore and to the elongated body, and means associated with the bore and the working member for transmitting a torque from the tool to the working member.

Although the prior known quick release chuck mechanisms generally operate satisfactorily, one or more problems exist that have not been solved thereby and require solutions. One problem is that the locking means of the set screw type for releasably holding the tool insert in the chuck mechanism may not be fully tightened or may loosen causing undersirable slippage of the tool and/or tool insert. In those instances where the locking means comprise balls seated in complementary recesses, the recesses could vary due to manufacturing tolerances resulting in play between the balls and recesses which may allow excessive movement therebetween. This adversely affects the accuracy and preciseness of operation of the tool.

Another problem presented by the prior known chuck mechanisms when mounted on the spindles of a multiple spindle head is that no means exist therein to compensate for tolerance differences in the commercial components and processed machine parts contained therein. Consequently, gage lines in end surfaces of the multiple spindles will vary in height above or below one another, thereby requiring an on line laborious adjustment of each spindle or chuck mechanism in order to get the gage lines of the spindles and/or chuck mechanisms mounted thereon to all lie in a common reference plane. Each time a tool insert is changed in an unadjusted prior known spindle head and chuck mechanisms, an on-line adjustment is required for each chuck mechanism to properly position the tool tip to lie in a common plane. In such a preset spindle head and chuck mechanism, a plurality of identical tool inserts of a finite length can only be mounted on the specific spindle for which it is designed since each spindle will require a different preset tool insert.

Therefore, an object of the present invention is to solve the aforementioned problems presented by the prior known multiple spindle heads and chuck mechanisms mounted thereon.

SUMMARY OF THE INVENTION

It is an object of the present invention to provide a quick release chuck mechanism for releasably holding a tool or the like comprising:

a body member having an axial bore extending therethrough, and an end surface transverse to said bore;

a tool insert having one end portion insertable in the axial bore, and its opposite end portion provided with a shoulder facing the end surface and engageable therewith;

adjusting means on the end surface of the body member for axial movement for axially varying the position of the end surface to achieve a predetermined end surface position; and means for releasably holding the tool insert in the body member with the shoulder in engagement with the end surface adjusting means.

A further object of the invention is to provide in a quick release chuck mechanism, a tool insert holding means comprising:

a tapered surface on one end portion of the insert;

an insert lock member slidably carried by the body member; and spring biased lock member actuating means on the body member movable between a normal lock position in which the lock member is biased against the tapered surface for positively locking the insert to the body member, and a retracted position in which the lock member is released to allow the insert to be removed from the body member.

Still another object of the invention is to provide a method of achieving interchangeability of tool inserts in a quick release chuck mechanism mounted on a drive spindle, the chuck mechanism having a body member with an axial bore extending therethrough, and an end surface transverse to the bore, the tool insert having an end portion insertable in the axial bore, an axial opening in the insert for receiving the tool, and an adjusting screw in the axial opening for adjusting the tool relative to the insert, the tool insert further having an opposite end portion provided with a shoulder facing the end surface and engageable therewith; adjusting means on the end surface of the body member for axial movement for axially varying the position of the end surface relative to the shoulder for achieving a predetermined end surface position; and means for releasably holding the tool insert in the body member with the shoulder in engagement with the end surface adjusting means; the method comprising the steps of:

adjusting the adjusting means on the end surface of the body member mounted on a complementary spindle to achieve a constant predetermined end surface position of the body member relative to a predetermined reference plane;

adjusting the adjusting screws on a plurality of tool inserts to obtain sharpened tool inserts of identical length from the tip of each tool to each shoulder; and mounting a sharpened tool insert on the body member so that the tip of the tool is a fixed distance from said reference plane, such tool insert adapted, when the tool is dull, to be quickly released by the holding means and replaced by a sharpened tool insert without the necessity of further adjustment of the adjusting means or adjusting screw to maintain said fixed distance between said reference plane and the tip of the tool.

BRIEF DESCRIPTION OF THE DRAWINGS

In the detailed description of the invention presented below, reference is made to the accompanying drawings, in which:

FIG. 3 is an exploded perspective view, partially in section, of the quick release chuck mechanism of FIG. 1;

FIG. 4 is a perspective view, partially in section, of a tapping tool insert;

DETAILED DESCRIPTION OF THE INVENTION

Figure 1:
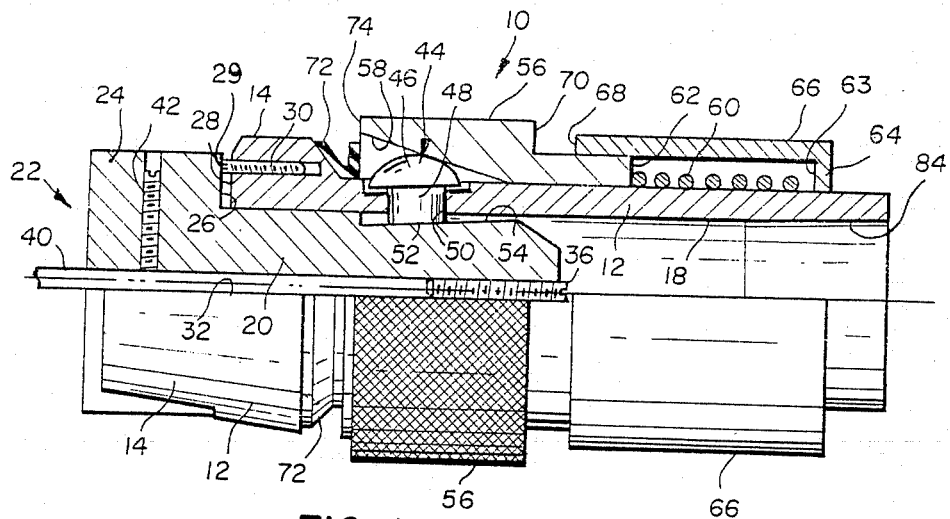
FIG. 1 is a side elevational view, partly in section, of a preferred embodiment of the quick release chuck mechanism of this invention with the lock member actuating means shown in its normal lock position in which the tool insert is locked to the body member.
Figure 2:
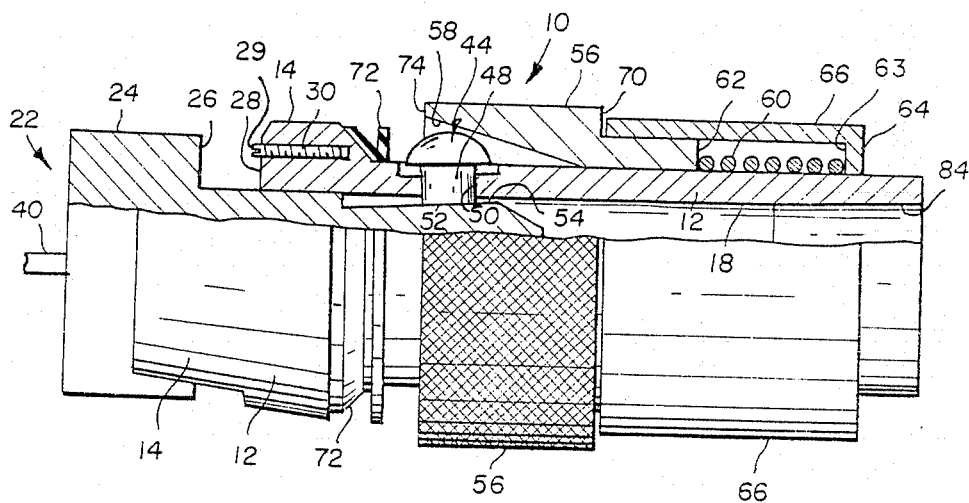
FIG. 2 is a side elevational view similar to FIG. 1 showing the lock member actuating means in its retracted position for releasing the tool insert.

Referring now to FIGS. 1-3 of the drawings, a preferred embodiment of the quick release chuck mechanism 10 of this invention is disclosed. The chuck mechanism 10 comprises a cylindrical body member 12 having a head 14 at one end provided with a slot 16 extending therethrough perpendicular to the axis of body member 12. The body member 12 has an axial bore 18 extending therethrough for snugly receiving a complementary end portion 20 of a tool insert 22. The opposite end portion or head 24 of tool insert 22 snuggly rests within slot 16 when the tool insert is fully inserted into bore 18, as shown in FIG. 1. In this nested position, slot 16 absorbs or limits radial torque and radial slippage of tool insert 22.

Insert head 24 has a shoulder 26 which engages an end surface 28 of body member 12. The end surface 28 includes an end surface 29 of an axial adjusting screw 30 in head 14. Accordingly the position of end surface 28 can be changed by adjusting the axial position of adjusting screw 30.

Tool insert 22 further has an axial opening 32 extending therethrough provided with inner threads 34 at end portion 20 for receiving a complementary adjusting screw 36 in threaded engagement therewith. By moving adjusting screw 36 in or out by an Allen wrench or the like, the position of tip 38 of a tool 40, such as a drill or the like, can be varied. Once properly positioned, tool 40 can be fixed to tool insert 22 by a radially extending set screw 42 in insert head 24.

The means for releasably locking tool insert 22 to chuck mechanism 10, as best seen in FIGS. 1 and 3, comprises a mushroom-shaped lock member 44 having a rounded head 46 at one end and a cylindrical stem 48 at the other end. The stem extends through a radially extending opening 50 in body member 12, and the end surface 52 of stem 48 bears against a tapered frustoconical surface 54 on end portion 20. The surface 54 has a taper, preferably varying from 3°-6° relative to its axis, and radially extending opening 50 has a similar taper relative to the vertical so that stem end 52 makes line contact with tapered surface 54. A cylindrical locking sleeve 56 is slidably mounted on body member 12, and the outer knurled surface thereof is manually gripped for slidable movement between a normal locked position, as seen in FIG. 1, and a retracted or lock released position, as seen in FIG. 2. Sleeve 56 has a frustoconical inner surface 58 of a taper of about 16° which is pressed by helical spring 60 into point contact engagement with rounded head 46, urging stem end 52 into firm line contact engagement with tapered surface 54 for positively locking tool insert 22 to body member 12. Any effort to remove tool insert 22 to increases the wedging action between stem 48 and tapered surface 54 which increases the locking action. Spring 60 encircles body member 12 and has one end thereof bearing against an end surface 62 of sleeve 56, and its opposite end bearing against inside surface 63 of end 64 of a spring housing 66, which is secured by any suitable means to body member 12. The opposite end 68 of housing 66 provides a stop for sleeve shoulder 70 when sleeve 56 is moved to its retracted position, as seen in FIG. 2. A rubber O ring 72 of V-shaped cross-section encircles body member 12 between head 14 and sleeve end 74 to prevent dirt or any other environmental contaminants from entering the space between sleeve surface 58 and body member 12 and interfering with proper functioning of the locking means.

With reference to FIG. 4, another embodiment of a tool insert 22' is shown for holding a tapping tool, not shown. In this tapping tool insert 22', parts similar to parts shown in FIGS. 1-3 are denoted by the same numerals primed. In tapping tool insert 22', the part of end portion 20' adjacent insert head 24' defines an axial opening 76 of preferably square-shaped cross-section for receiving a complementary square-shaped end of a tapping tool, not shown. Also, for the tapping application, no need exists for a threaded portion similar to threaded portion 34 and an adjusting screw similar to adjusting screw 30, which are therefor omitted.

Figure 5:
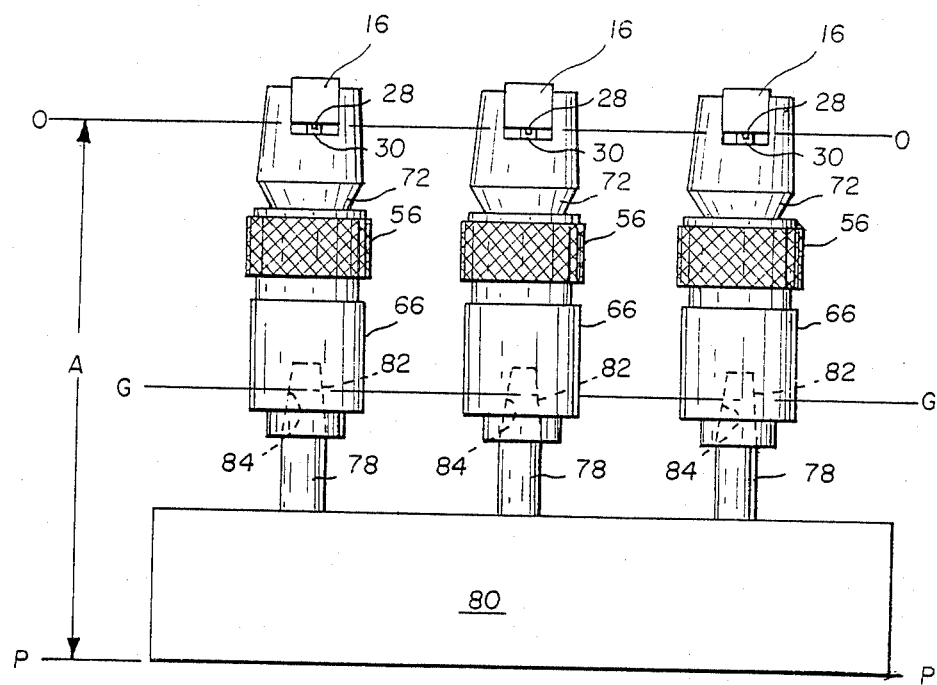
FIG. 5 is a side elevational view of a multiple head spindle in diagrammatic form onto which chuck mechanisms are mounted, and showing how the end surfaces thereof can be adjusted to achieve a common predetermined end surface position which is a distance A from a common reference plane.
Figure 6:
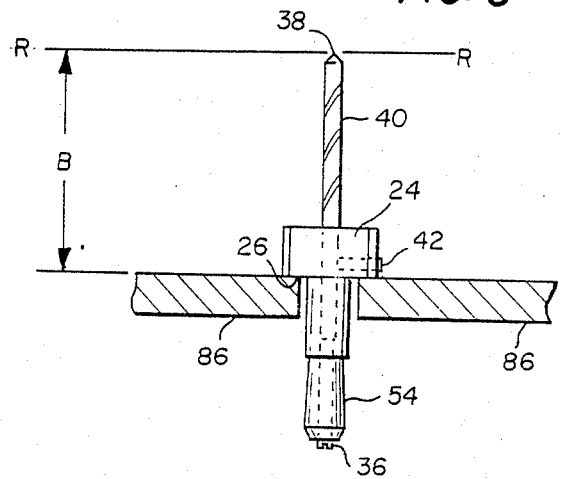
FIG. 6 is a side elevational view of a tool insert mounted on a pair of spaced rails for use in presetting the tool insert to a common overall finite length B from its shoulder to the tip of the tool.

Referring now to FIGS. 5 and 6, a method is shown for qualifying all of the spindles 78 of a multiple spindle head 80 by means of the improved chuck mechanism of this invention. As is well known, each spindle 78 is provided with a frustoconically tapered end 82 for receiving, in driving engagement therewith, a complementary inner frustoconically tapered surface 84 on end portion 20 of insert 22, which is manually pressed thereon. Alternatively, other known means in the industry for drivingly connecting spindle 78 to the chuck mechanism may be used, such as interengaging threaded members thereon, for example. As noted earlier, variations in commercial components and processed machine parts, when assembled, can accumulate tolerances resulting in chuck mechanism 10 mounted on spindle ends 82 that have end surfaces 28 that do not all lie in a common reference plane O—O, measured from a horizontal reference plane P—P by any suitable commercially available coordinate measuring device or the like. The spindles 78 are all qualified by adjusting the adjusting screws 30 on chuck mechanisms 10 with an Allen wrench or the like so that the end surfaces 28 thereof all lie in plane O—O. This eliminates the laborious task heretofore required of remachining the spindles or disassembling the head and shimming certain components in one or the other direction in order to qualify gage lines in end surfaces of the spindles along a common gage line G—G. Once the spindles and chuck mechanisms are all qualified, a plurality of tool inserts 22 can be preset off line so that whenever a tool 40 becomes dull, the dulled tool insert can be quickly removed from the quick release chuck mechanism 10 and replaced by a preset tool insert 22 having a sharp tool 40.

The tool inserts 22 are preset off line, as shown in FIG. 6, by placing a plurality of tool inserts on a pair of fixed, spaced horizontal rails 86 with shoulders 26 of the inserts resting on the rails. Sharpened tools 40 are mounted in each insert 22, and the heights thereof adjusted to a uniform B dimension by the adjusting screws 36 of each insert until the tool tips 38 thereof all lie in a common reference plane R—R, as measured by the probe of any suitable commerically available coordinate measuring device. At this point, all tool inserts 22 have a common finite overall length, and can be repeatably placed in any qualified chuck mechanism 10 on any spindle 78 of the multiple spindle head 80 without any change in the common depth achieved by the tools 40 thereof. That is, all of the tips 38 of all of the tools 40 will always lie in a common plane.

While a preferred embodiment of the invention has been shown and described with particularity, it will be appreciated that various changes and modifications may suggest themselves to one having ordinary skill in the art upon being apprised of the present invention. It is intended to encompass all such changes and modifications as fall within the scope and spirit of the appended claims.

What is claimed is:

1. A quick release chuck mechanism for releasably holding a tool or the like comprising:
   a body member having an axial bore extending therethrough, and an adjustable end surface transverse to said bore;
   a tool insert having one end portion insertable in said axial bore, and its opposite end portion provided with a shoulder facing said end surface and engageable therewith;
   an adjusting means on said body member for axially varying the position of said adjustable end surface to achieve a predetermined end surface position; and
   means for releasably holding said tool insert in said body member with said shoulder in engagement with said end surface.

2. A quick release chuck mechanism according to claim 1 wherein said adjusting means comprises an axial threaded bore, and a screw in threaded engagement with said bore.

3. A quick release chuck mechanism according to claim 1 wherein said tool insert is substantially T-shaped.

4. A quick release chuck mechanism according to claim 1 wherein said tool insert has a tapered surface on said one end portion thereof, and said tool insert holding means comprises an insert lock member slidably carried by said body member, and a spring biased lock member actuating means movable between a normal lock position in which said lock member is biased against said tapered surface for locking said insert to said body member, and a retracted position in which said lock member is released to allow said insert to be removed from said body member.

5. A quick release chuck mechanism according to claim 4 wherein said body member has a substantially radially extending opening, and said lock member has a rounded head at one end thereof interposed between the outer surface of said body member and said lock member actuating means, said lock means further having a stem at the other end thereof slidably movable within said opening into engagement with said tapered surface.

6. A quick release chuck mechanism according to claim 5 wherein said opening is oriented at the same angle as said tapered surface so that said stem is perpendicular to said tapered surface.

7. A quick release chuck mechanism according to claim 6 wherein said tapered surface is tapered at an angle of substantially 3°–6° from the axis of said body member.

8. A quick release chuck mechanism for releasably holding a tool or the like comprising:

a body member having an axial bore extending therethrough, an adjustable end surface transverse to said bore, and a substantially radially extending opening;

an adjusting means on said body member for axially varying the position of said adjustable end surface to achieve a predetermined end surface position;

a tool insert having one end portion insertable in said axial bore, and its opposite end portion provided with a shoulder facing said end surface and engageable therewith; and means for releasably holding said tool insert in said body member with said shoulder in engagement with said end surface, said tool insert holding means comprising a tapered surface on said one end portion of said insert, a mushroom shaped insert lock member having a rounded head at one end and a stem at the other end, said lock member slidably carried in said radially extending opening, and spring biased lock member actuating means movable on said body member between a normal lock position in which the actuating means engages the head of the lock member and the stem of the lock member is biased against said tapered surface for locking said insert to said body member, and a retracted position in which said lock member is released to allow said insert to be removed from said body member.

9. A quick release chuck mechanism according to claim 8 wherein said opening is oriented at the same angle as said tapered surface so that said stem is perpendicular to said tapered surface.

10. A quick release chuck mechanism according to claim 10 wherein said tapered surface is tapered at an angle of substantially 3°–6° from the axis of said body member.

11. A quick release chuck mechanism according to claim 8 wherein said lock member actuating means comprising a collar slidably mounted on said body member in coaxial relationship therewith, said collar having a frustoconically shaped surface for engaging said rounded head of said lock member, a cup-shaped housing secured to said body member, and a helical spring encircling said body member and interposed between said housing and said collar for biasing said frustoconically shaped surface of said collar into engagement with said rounded head.

12. A quick release chuck mechanism according to claim 12 wherein said frustoconically shaped surface forms an angle of approximately 16° relative to the axis of said body member.

13. A quick release chuck mechanism according to claim 11 wherein one end of said collar engages one end of said housing which provides a stop for said collar when said lock member actuating means is moved to its retracted position.

* * * * *